(12) United States Patent
Kobayashi

(10) Patent No.: US 10,508,729 B2
(45) Date of Patent: Dec. 17, 2019

(54) STRAIN WAVE GEARING DEVICE

(71) Applicant: HARMONIC DRIVE SYSTEMS INC., Shinagawa-ku, Tokyo (JP)

(72) Inventor: Masaru Kobayashi, Azumino (JP)

(73) Assignee: Harmonic Drive Systems Inc., Shinagawa-ku, Tokyo (JP)

( * ) Notice: Subject to any disclaimer, the term of this patent is extended or adjusted under 35 U.S.C. 154(b) by 417 days.

(21) Appl. No.: 15/519,650

(22) PCT Filed: Nov. 21, 2014

(86) PCT No.: PCT/JP2014/080958
§ 371 (c)(1),
(2) Date: Apr. 17, 2017

(87) PCT Pub. No.: WO2016/079875
PCT Pub. Date: May 26, 2016

(65) Prior Publication Data
US 2017/0350497 A1    Dec. 7, 2017

(51) Int. Cl.
*F16H 57/04* (2010.01)
*F16H 49/00* (2006.01)

(52) U.S. Cl.
CPC ....... *F16H 57/0413* (2013.01); *F16H 49/001* (2013.01); *F16H 57/0464* (2013.01); *F16H 57/0486* (2013.01)

(58) Field of Classification Search
CPC ............... F16H 49/001; F16H 57/0413; F16H 57/0464; F16H 57/0486
(Continued)

(56) References Cited

U.S. PATENT DOCUMENTS 7,950,857 B2 *  5/2011  Glueck ................. F16C 35/067
                                                      384/476
2017/0227113 A1 *  8/2017  Malone .................... B60K 6/40

FOREIGN PATENT DOCUMENTS

DE    10 2013 001114    *  7/2014
DE    10 2013 001115    *  7/2014
(Continued)

OTHER PUBLICATIONS

International Search Report (PCT/ISA/210) dated Feb. 10, 2015, by the Japanese Patent Office as the International Searching Authority for International Application No. PCT/JP2014/080958 (5 pages).
(Continued)

*Primary Examiner* — William C Joyce
(74) *Attorney, Agent, or Firm* — Buchanan Ingersoll & Rooney PC

(57) ABSTRACT

A strain wave gearing device has a grease temperature control mechanism for controlling the grease temperature of a portion of grease, of the grease filled inside an externally toothed gear of the strain wave gearing device, the portion of the grease being disposed on the outer peripheral side portion of a wave generator. The grease temperature control mechanism has a circular heater facing the outer peripheral side portion of the wave generator over the entire circumference from a direction of a device central axis line. By controlling the grease temperature of a specified portion inside the externally toothed gear, it is possible to reliably start the strain wave gearing device even in an extremely low temperature environment where the grease solidifies.

8 Claims, 4 Drawing Sheets

(58) Field of Classification Search
USPC .......................................................... 74/640
See application file for complete search history.

(56) References Cited

FOREIGN PATENT DOCUMENTS

| | | | |
|---|---|---|---|
| DE | 10 2013 001116 | * | 7/2014 |
| JP | 5-309588 A | | 11/1993 |
| JP | 6-11406 Y2 | | 3/1994 |
| JP | 2007-255607 A | | 10/2007 |
| JP | 2009-103159 A | | 5/2009 |

OTHER PUBLICATIONS

Written Opinion (PCT/ISA/237) dated Feb. 10, 2015, by the Japanese Patent Office as the International Searching Authority for International Application No. PCT/JP2014/080958 (3 pages).

* cited by examiner

STRAIN WAVE GEARING DEVICE

TECHNICAL FIELD

The present invention relates to strain wave gearing devices having a cup-shaped or silk hat-shaped flexible externally toothed gear. More particularly, the present invention relates to a strain wave gearing device which incorporates a heater for heating grease and can be started even under extremely low temperature environments difficult to start.

BACKGROUND ART

As a strain wave gearing device, a cup type strain wave gearing device having a cup-shaped flexible externally toothed gear, and a silk hat type strain wave gearing device having a silk hat-shaped, flexible externally toothed gear are known. In the cup-shaped externally toothed gear, external teeth are formed on the outer peripheral surface portion of a section at the front opening end of the cylindrical body part which is flexible in a non-circular shape, a diaphragm extending inward in the radial direction is formed on the rear opening end, and a disc-like or annular boss is formed on the inner peripheral edge of the diaphragm. The diaphragm and the boss correspond to the bottom portion of the cup shape. The externally toothed gear is fixedly fastened to a member such as a load side member through the boss. In the silk hat-shaped externally toothed gear, external teeth are formed on the outer peripheral surface portion at the front opening end of the cylindrical body portion, a diaphragm extending radially outward is formed at the rear opening end of the cylindrical body, and an annular boss is formed on the outer peripheral edge of the diaphragm. The diaphragm and the boss correspond to the brim portion of the silk hat shape.

In the cup type strain wave gearing device or the silk bat type strain wave gearing device, each contact portion to be lubricated is lubricated by grease filled inside thereof or applied thereon. A strain wave gearing device which is lubricated with grease may not be able to start with a low capacity motor when it is operated in a low temperature environment.

Patent Document 1 proposes a method of heating a strain wave gearing device from the outside in a low temperature environment, for example, at a low temperature of −30° C. to reduce the viscosity of the grease in order to smoothly drive the strain wave gearing device. In the strain wave gearing device disclosed here, component parts thereof are manufactured from a material having high thermal conductivity, a heater is attached to the outer peripheral surface of the internally toothed gear in a surface contact state, so that heat from the heater is transmitted to the whole of the strain wave gearing device. Based on the measurement result of the thermometer disposed in the vicinity of the heater, the temperature of the heater is adjusted, so that the temperature of grease, which is filled between the internally toothed gear and the externally toothed gear or between the wave generator and the externally toothed gear, or is applied on the inner side of the wave generator, is controlled to be kept constant (paragraphs 0008 to 0014 of Patent Document 1).

PRIOR ART

Patent Document

[Patent Document 1] JP 2007-255607 A

SUMMARY OF THE INVENTION

Problems to be Solved by the Invention

The strain wave gearing device operated under a low temperature environment is lubricated with a grease that is exclusively used in low temperatures. However, under the environment of −30° C. or lower, due to the viscosity of the grease, the relational torque at the time of starting suddenly increases, the strain wave gearing device may not be able to start with a low capacity motor. Further, under an extremely low temperature environment, for example, under an environment of −55° C. or lower, the rotational torque at the time of starting suddenly increases due to the plasticity and viscosity of the grease, and there is a case in which the strain wave gearing device cannot start with a low capacity motor. Here, the low-temperature grease emphasizes the startability of the strain wave gearing device and uses a base oil having a small kinematic viscosity, so that sufficient lubricating performance cannot be expected in a high load operation under an environment of room temperature or higher.

In the method, disclosed in Patent Document 1, the whole of the strain wave gearing device is heated by using a heater in a low temperature environment, and the temperature of the grease in each portion of the device is kept constant. However, in order to keep the temperature of the grease in each part constant, a large amount of heat is necessary. Also, when heating from the side of the outer peripheral surface of the internally toothed gear, it takes time to heat the grease inside the wave generator to a predetermined temperature. In addition, if the amount of heat input is increased, the grease near the heater may be overheated to a temperature higher than the room temperature, and there is a possibility that sufficient lubrication performance can not be exhibited. In particular it is difficult to keep the temperature of the grease inside the strain wave gearing device constant under the extremely low temperature environment.

It is an object of the present invention to provide a strain wave gearing device which can reliably start by controlling the temperature of a part of grease inside the strain wave gearing device even under a cryogenic environment in which it is difficult to start the strain wave gearing device.

Means Solving the Problems

In order to solve the above problems, a strain wave gearing device of the present invention includes:

a rigid internally toothed gear;

a flexible externally toothed gear of a cup shape or a silk hat shape;

a wave generator which is mounted on an inner side of the externally toothed gear, flexes the externally toothed gear in a non-circular shape to partly mesh with the internally toothed gear, and moves meshing positions of the two gears in a circumferential direction; and a grease temperature control mechanism for controlling a temperature of a grease portion covering an outer peripheral side portion of the wave generator, among greases filled inside the externally toothed gear;

wherein the grease temperature control mechanism includes a heater which faces the outer peripheral side portion of the wave generator over an entire circumference from a direction of a device central axis line.

The starting torque of the strain wave gearing device under a low temperature environment, particularly under an extremely low temperature environment, is greatly affected by the amount of grease in the portion of the wave generator disposed inside the externally toothed gear and the grease temperature in this portion. In other words, if the plasticity and viscous resistance of the grease in this portion are high, the starting torque is greatly increased. Also, once started, that is, when the wave generator starts to rotate by the motor, the running torque of the strain wave gearing device decreases and returns to the normal rotation torque, which is caused by the flow of the grease applied to the wave generator or filled around Use wave generator (for example, the movement of the grease to the race way part of the wave generator), the heat generated by the viscosity of the grease (heat generation due to the viscous resistance of the bearing race way part of the wave generator where high shear force is applied), and other factors.

Therefore, the plasticity and the viscous resistance of grease applied to, filled in or covering the wave generator that determines whether it starts or not, should be lowered before staring. Specifically, by controlling the temperature of (or by heating) a specified grease portion inside or around the bearing portion of the wave generator among the grease inside the strain wave gearing device, it is possible for the strain wave gearing device to start in a low temperature environment, and in particular, to start even in an extremely low temperature environment.

According to the strain wave gearing device of the present invention, in the consideration of the above point, a heater is disposed in the vicinity of the outer circumferential side portion of the wave generator disposed inside the externally toothed gear. As a result, it is possible to control the temperature of the specified grease portion by heating by the heater, the specified grease portion being a grease portion applied to the outer peripheral side portion of the wave generator or being a grease portion filled in the surroundings of the wave generator.

This makes it possible to lower the starting torque of the strain wave gearing device in a low temperature environment and to start the strain wave gearing device with a low capacity motor. In addition, since it is sufficient to heat only a part of the grease (that is, the grease disposed in the specified portions), such a large amount of heat is not required, as in a case where the grease inside the strain wave gearing device is heated as a whole and is maintained at a constant temperature. Also, such harmful effects that the grease portion located near the heater is overheated and the sufficient lubrication performance cannot be expected do not occur.

In the strain wave gearing device of the present invention, the grease temperature control mechanism includes a temperature detector for detecting the temperature of the grease portion of the strain wave gearing device, and a control unit for driving the heater based on the detected temperature of the temperature detector, and controlling the temperature of the grease portion at the time of starting. With this, the grease temperature control can be performed with high accuracy.

In the strain wave gearing device of the present invention, the heater can be opposed to the inner peripheral surface over the entire circumference of the inner peripheral surface of the externally toothed gear in a non-contact state.

Further, the heater can be brought into contact with the inner circumferential surface over the entire circumference of the inner circumferential surface of the externally toothed gear. In this case, a heater having flexibility capable of flexing together with the inner peripheral surface of the externally toothed gear may be used. For example, a heating wire wound in a coil spring shape, a plate-like heater such as a silicone rubber heater, or the like can be used as the heater.

In the case where a plate-like heater such as a silicone rubber heater is used, the heater can be attached to the entire circumference of the inner circumferential surface of the externally toothed gear.

In the strain wave gearing device of the present invention, the heater can be supported by a heater support member that integrally rotates with the externally toothed gear.

There is a case in which the strain wave gearing device having a cup-shaped flexible externally toothed gear is provided with an output flange, a pressing member, and a fastening bolt for fixedly fastening the output flange, the pressing member and the boss of the externally toothed gear in state sandwiching the boss between the output flange and the pressing member. In this case, a heater support member for supporting the heater may be fixed to the pressing member. Alternatively, the pressing member and the heater support member may be formed of a single member.

EMBODIMENTS FOR CARRYING OUT THE INVENTION

Embodiments of the strain wave gearing device according to the present invention will be described with reference to the drawings.

[Overall Structure]

Figure 1:
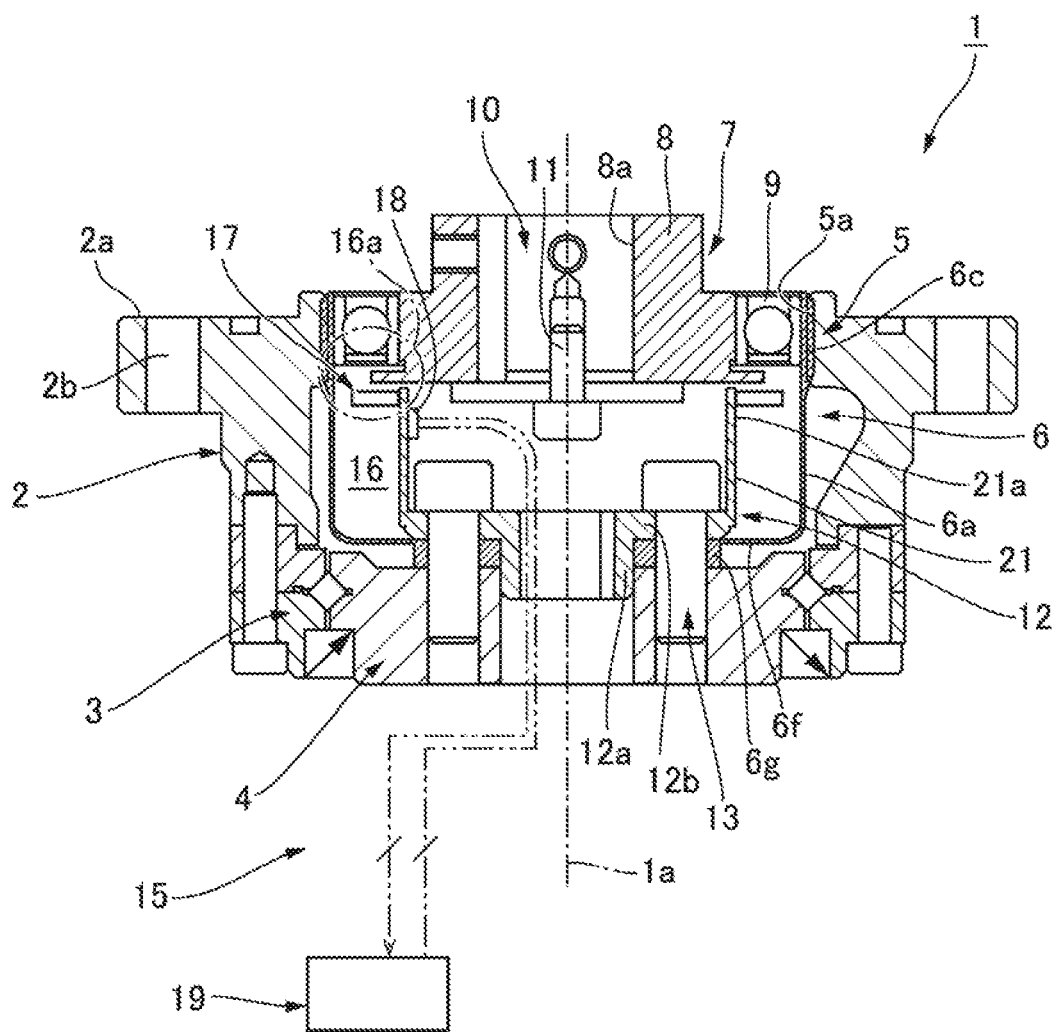
FIG. 1 is a longitudinal cross sectional view showing a cup type strain wave gearing device according to an embodiment of the present invention.

FIG. 1 is a longitudinal sectional view showing a cup type strain wave gearing device according to the present embodiment. The strain wave gearing device 1 has a tubular device housing 2. A disk-shaped output flange 4 is mounted in a rotatable state via a cross roller bearing 3 to a rear end part (a lower portion in the drawing) of the device housing 2.

A mounting flange 2a is formed on the outer peripheral part of the device housing 2, and bolt holes 2b are formed in the mounting flange 2a at a predetermined pitch in the circumferential direction, internal teeth 5a are formed on the circular inner peripheral surface of the front-end part of the device housing 2. This front-end part functions as a rigid internally toothed gear 5. In other words, the internally toothed gear 5 is integrally formed in the device housing 2. Inside the device housing 2, a cup-shaped flexible externally toothed gear 6 is arranged coaxially. On the inner side of the externally toothed gear 6, a wave generator 7 is coaxially mounted. The wave generator 7 causes the externally toothed gear 6 to flex into a non-circular shape, for example, an elliptical shape, and to partially mesh with the internally toothed gear 5.

The wave generator is provided with a rigid plug 8 having a shaft hole 8a for connecting an input shaft and is provided with a wave bearing 9 mounted on the elliptical outer peripheral surface of the plug 8. The wave beating 9 is a bearing having bearing rings that can be flexed in a radial direction, and in a state where it is attached to the plug 8, the outer peripheral surface of the outer ring is elliptically flexed. The input shaft 10 inserted into the shaft hole 8a of the plug 8 is coaxially and fixedly fastened to the plug 8 by a fastening bolt 11 or the like. An output rotation from a motor or the like is input to the wave generator 7 via the input shaft 10.

The externally toothed gear 6 is provided with a cylindrical body part 6a which can be flexed in a non-circular shape. External teeth 6c are formed on the outer peripheral surface portion at the side of the front opening end of the cylindrical body part 6a. The portion where the external teeth 6c are formed in the cylindrical, body part 6a is called an external-tooth forming portion. A diaphragm 6f extends radially inward from the rear end of the cylindrical body part 6a. An annular boss 6g is formed continuously from the inner peripheral edge of the diaphragm 6f.

A wave generator 7 is mounted inside the external-tooth forming portion of the cylindrical body part 6a of the externally toothed gear 6. The external-teeth forming portion is flexed in an elliptical shape by the wave generator 7, and the external teeth 6c located at both ends of the major axis of the elliptical shape mesh with the internal teeth 5a of the internally toothed gear 5.

The boss 6g of the externally toothed gear 6 is coaxially fastened and fixed to the output flange 4 by a plurality of fastening bolts 13 in a state sandwiched between the pressing member 12 and the output flange 4. The pressing member 12 is formed with a cylindrical portion 12a and a disk-like portion 12b extending radially outward from the front opening end of the cylindrical portion 12a. The cylindrical portion 12a is fitted into a hollow hole of the boss and a hollow hole of the output flange 4 from the front side of the boss 6g, and positions the boss 6g and the output flange 4 so as to be coaxial with each other. These three members are fastened and fixed by the fastening bolts 13 in a state in which the boss 6g is sandwiched between, the disk-life portion 12b and the output flange 4.

(Grease Temperature Control Mechanism)

A grease temperature control mechanism 15 is assembled to the strain wave gearing device 1. The grease temperature control mechanism 15 controls the temperature of the grease portion 16a covering the outer peripheral side portion of the wave generator s out of grease 16 filled inside the externally toothed gear 6. That is, as indicated by a one-dot chain line circle in the drawing, the temperature of the grease portion applied to or filled in the wave bearing 9 of the wave generator 7 and located on the lateral side of the wave bearing 9 is controlled.

The grease temperature control mechanism 15 is provided with a circular heater 17 which feces the outer peripheral side portion of the wave generator 7 over its entire circumference from the direction of the device central axis 1a. It is also provided with a temperature detector 18 such as a thermocouple for detecting the temperature of the grease portion, and a control unit 19 that drives the heater 17 based on the detected temperature of the temperature detector 18 to control the temperature of the grease portion 16a at the time of starting the strain wave gearing device 1.

Here, the heater 17 is a plate-like heater having a rectangular cross section formed in an annular shape, and is attached to a cylindrical heater support member 21. In the present example, the heater support member 21 is integrally formed with the pressing member 12 fixed to the boss 6g. That is, a cylindrical heater support member 21 extending to the vicinity of the wave generator 7 is formed along the direction of the device central axis 1a at the outer peripheral edge portion of the disc-like portion 12b of the pressing member 12. The circular heater 17 is attached to a distal end opening portion 21a of the neater support member 21. The heater 17 faces the outer peripheral side portion of the wave generator 7 (the portion of the wave bearing 9) from the direction of the device central axis 1a at a predetermined gap.

In the strain wave gearing device 1 having the grease temperature control mechanism 15, the heater 17 is disposed in the vicinity of the outer peripheral portion of the wave generator 7 in the externally toothed gear 6. The temperature of the grease portion of the grease 16 inside the externally toothed gear 6 can be controlled by the heater 17.

Even when using a commercially-available low temperature grease for strain wave gearing devices, the grease solidifies in extremely low temperature conditions of −55° C. or lower, and at −65° C., the strain wave gearing device 1 cannot be started with a normal motor. In the strain wave gearing device 1 of the present embodiment, the grease temperature control mechanism 15 is used to heat the grease portion of the outer peripheral side portion of the wave generator 7 among the grease 16 inside the externally toothed gear 6, and controls the grease portion to be maintained in a high temperature state. Thereby, it is possible to reliably start the strain wave gearing device 1 even under an extremely low temperature environment.

(Modification 1 of Grease Temperature Control Mechanism)

Figure 2:
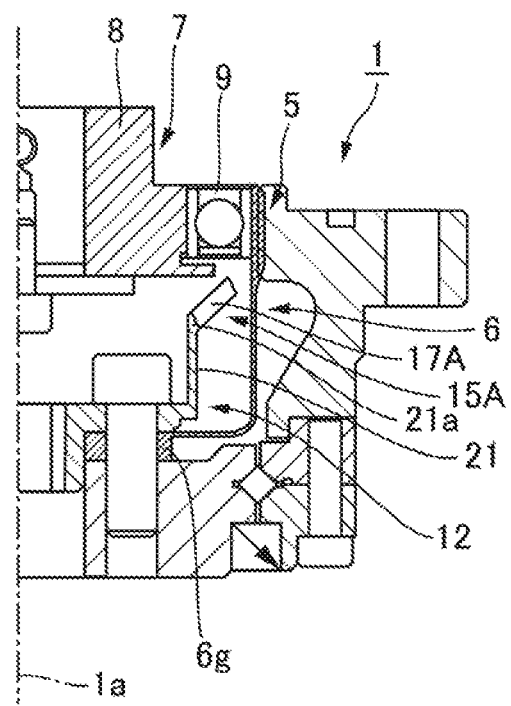
FIG. 2 is a half longitudinal cross sectional view showing a modification 1 of a grease temperature control mechanism of FIG. 1.

FIG. 2 is a half longitudinal sectional view of a strain wave gearing device to which the present invention is applied, showing a modification 1 of the grease temperature mechanism 15. A grease temperature control mechanism 15A of this example is provided with a truncated cone-shaped heater 17A spreading outward in the radial direction toward the wave generator 7. Since the configurations other than this are the same as those shown, in FIG. 1, explanations thereof will be omitted.

(Modification 2 of Grease Temperature Control Mechanism)

Figure 3:
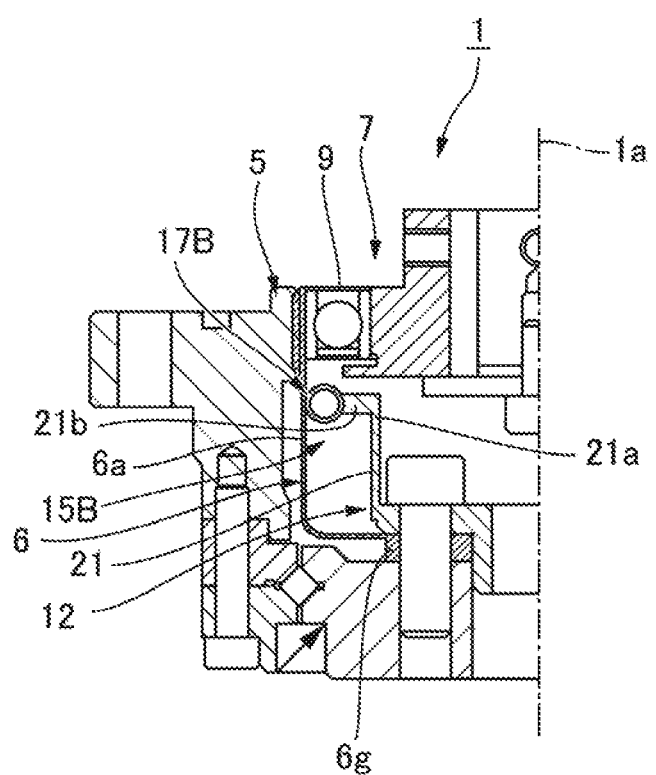
FIG. 3 is a half longitudinal cross sectional view showing a modification 2 of a grease temperature control mechanism of FIG. 1.

FIG. 3 is a half longitudinal sectional view of a strain wave gearing device to which the present invention is applied, showing a modification 2 of the grease temperature control mechanism 15. A grease temperature control mechanism 15B of this example has a circular heater 17B in which a heating wire is wound like a coil spring. Other configurations are the same as those shown in FIG. 1.

The heater 17B is attached to the outer peripheral surface of an annular mounting flange 21b extending radially outward from the distal end opening portion 21a of the heater support member 21. It also comes in contact with the inner peripheral surface of the cylindrical body part 6a of the externally toothed gear 6 over the entire circumference thereof by the mounting flange 21b. In accordance with the rotation of the wave generator 7 having the elliptical contour, the cylindrical body part 6a is repeatedly flexed in each portion thereof in the radial direction. Since the circular heater 17B has flexibility capable of following the deflection of the cylindrical body part 6a, the circular heater 17B is kept in contact with the inner peripheral surface of the cylindrical body part 6a over the entire circumference.

(Modification 3 of Grease Temperature Control Mechanism)

Figure 4:
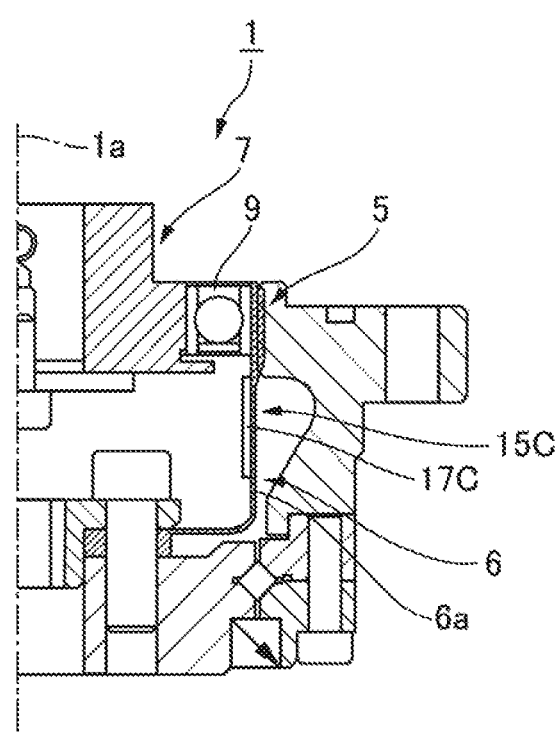
FIG. 4 is a half longitudinal cross sectional view showing a modification 3 of a grease temperature control mechanism of FIG. 1.

FIG. 4 is a half longitudinal sectional view of a strain wave gearing device to which the present invention is applied, showing a modification 3 of the grease temperature control mechanism 15. A heater 17C of a grease temperature control mechanism 15C of this example is a plate heater having a resilient characteristic (flexibility) such as a silicone rubber heater and is formed into a cylindrical shape. Further, the heater 17C is directly attached to the entire circumference of the inner peripheral surface of the cylindrical body part 6a of the externally toothed gear 6 by an adhesive or the like. Therefore, the heater support member 21 in each of the above examples is unnecessary. Other configurations are the same as those shown in FIG. 1.

The invention claimed is:

1. A strain wave gearing device comprising:
a rigid internally toothed gear;
a flexible externally toothed gear including a non-circularly flexible cylindrical body part with a diaphragm extending outward or inward in a radial direction from an end of the cylindrical body part;
a wave generator which is mounted on an inner side of the cylindrical body part of the externally toothed gear, flexes the externally toothed gear in a non-circular shape to partly mesh with the internally toothed gear, and moves meshing positions of the two gears in a circumferential direction; and
a grease temperature control mechanism for controlling a temperature of a grease portion covering an outer peripheral side portion of the wave generator, of grease filled inside the externally toothed gear;
wherein the grease temperature control mechanism includes a heater facing the outer peripheral side portion of the wave generator over an entire circumference thereof from a direction of a device central axis line, and
wherein the heater is in contact with an inner peripheral surface of the cylindrical body part of the externally toothed gear over an entire circumference of the inner peripheral surface, and the heater has a flexibility capable of flexing together with the inner peripheral surface.

2. The strain wave gearing device according to claim 1, wherein the grease temperature control mechanism includes:
a temperature detector for detecting the temperature of the grease portion; and
a control unit which, based on a detected temperature of the temperature detector, drives the heater to control the temperature of the grease portion at a time of starting.

3. A strain wave gearing device comprising:
a rigid internally toothed gear;
a flexible externally toothed gear including a non-circularly flexible cylindrical body part with a diaphragm extending outward or inward in a radial direction from an end of the cylindrical body part;
a wave generator which is mounted on an inner side of the cylindrical body art of the externally toothed gear, flexes the externally toothed gear in a non-circular shape to partly mesh with the internally toothed gear, and moves meshing positions of the two gears in a circumferential direction; and
a grease temperature control mechanism for controlling a temperature of a grease portion covering an outer peripheral side portion of the wave generator, of grease filled inside the externally toothed gear;
wherein the grease temperature control mechanism includes a heater facing the outer peripheral side portion of the wave generator over an entire circumference thereof from a direction of a device central axis line, and
wherein the heater is attached to an inner peripheral surface of the cylindrical body part of the externally toothed gear over an entire circumference of the inner peripheral surface, and the heater has a flexibility capable of flexing together with the inner peripheral surface.

4. The strain wave gearing device according to claim 3, wherein the grease temperature control mechanism includes:
a temperature detector for detecting the temperature of the grease portion; and
a control unit which, based on a detected temperature of the temperature detector, drives the heater to control the temperature of the grease portion at a time of starting.

5. A strain wave gearing device comprising:
a rigid internally toothed gear;
a flexible externally toothed gear including a non-circularly flexible cylindrical body part with a diaphragm extending outward or inward in a radial direction from an end of the cylindrical body part;
a wave generator which is mounted on an inner side of the cylindrical body part of the externally toothed gear, flexes the externally toothed gear in a non-circular shape to partly mesh with the internally toothed ear, and moves meshing positions of the two gears in a circumferential direction; and
a grease temperature control mechanism for controlling a temperature of a grease portion covering an outer peripheral side portion of the wave generator, of grease filled inside the externally toothed gear;
wherein the grease temperature control mechanism includes a heater facing the outer peripheral side portion of the wave generator over an entire circumference thereof from a direction of a device central axis line,
wherein the externally toothed gear includes a disk-like or annular boss formed on an inner peripheral edge of the diaphragm wherein the heater is supported by a heater support member that rotates integrally with the externally toothed gear;
the strain wave gearing device further comprising:
an output flange;
a pressing member; and
a fastening bolt for fixedly fastening the pressing member, the output flange and the boss in a state in which the boss is sandwiched between the pressing member and the output flange,
wherein the heater support member is fixed to the pressing member, or the heater support member and the pressing member are formed as a single member.

6. The strain wave gearing device according to claim 5, wherein the heater faces an inner peripheral surface of the cylindrical body part of the externally toothed gear over an entire circumference of the inner peripheral surface in a non-contact state.

7. The strain wave gearing device according to claim 5, wherein the heater is in contact with an inner peripheral surface of the cylindrical body part of the externally toothed gear over an entire circumference of the inner peripheral surface, and the heater has a flexibility capable of flexing together with the inner peripheral surface.

8. The strain wave gearing device according to claim 5, wherein the grease temperature control mechanism includes:
a temperature detector for detecting the temperature of the grease portion; and a control unit which, based on a detected temperature of the temperature detector, drives the heater to control the temperature of the grease portion at a time of starting.

\* \* \* \* \*